(12) United States Patent
Kallal et al.

(10) Patent No.: US 9,130,369 B2
(45) Date of Patent: Sep. 8, 2015

(54) WIRELESS POWER OVERVOLTAGE PROTECTION CIRCUIT WITH REDUCED POWER DISSIPATION

(71) Applicant: QUALCOMM Incorporated, San Diego, CA (US)

(72) Inventors: Edward Kenneth Kallal, San Diego, CA (US); Pavel Monat, San Diego, CA (US); Ryan Tseng, Coronado, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 13/797,674

(22) Filed: Mar. 12, 2013

(65) Prior Publication Data

US 2014/0063666 A1 Mar. 6, 2014

Related U.S. Application Data

(60) Provisional application No. 61/694,712, filed on Aug. 29, 2012.

(51) Int. Cl.
| | |
|---|---|
| H02H 9/00 | (2006.01) |
| H02H 3/20 | (2006.01) |
| H02J 7/00 | (2006.01) |
| H02J 7/02 | (2006.01) |

(Continued)

(52) U.S. Cl.
CPC . *H02H 3/20* (2013.01); *H02H 9/04* (2013.01); *H02J 5/005* (2013.01); *H02J 7/0029* (2013.01); *H02J 7/025* (2013.01)

(58) Field of Classification Search
USPC .......................................... 361/56, 91.1, 111
See application file for complete search history.

(56) References Cited

U.S. PATENT DOCUMENTS

| | | | |
|---|---|---|---|
| 2003/0076638 A1 | 4/2003 | Simonelli et al. | |
| 2007/0232241 A1* | 10/2007 | Carley et al. | .................... 455/83 |
| 2008/0079392 A1 | 4/2008 | Baarman et al. | |

(Continued)

FOREIGN PATENT DOCUMENTS

| | | |
|---|---|---|
| GB | 2465678 A | 6/2010 |
| WO | WO-0059094 A2 | 10/2000 |

(Continued)

OTHER PUBLICATIONS

International Search Report and Written Opinion—PCT/US2012/060626—ISA/EPO—Feb. 5, 2013.

(Continued)

*Primary Examiner* — Danny Nguyen
(74) *Attorney, Agent, or Firm* — Knobbe, Martens, Olson & Bear, LLP

(57) ABSTRACT

Systems, methods, and apparatus for overvoltage protection in a wireless power receiver are disclosed. One aspect of the disclosure is a wireless power receiver apparatus. The apparatus includes an antenna circuit configured to wirelessly receive power, from a transmitter, at a level sufficient to power or charge a load, wherein the antenna circuit is electrically connected to an overvoltage protection circuit that is electrically connected between the antenna circuit and the load. The apparatus also includes a matching circuit electrically connected to the antenna circuit and a switching element electrically connected to the matching circuit. At least one of the matching circuit or the switching element is configured to control an amount of the received power flowing into the overvoltage protection circuit.

24 Claims, 12 Drawing Sheets

(51) Int. Cl.
*H02J 5/00* (2006.01)
*H02H 9/04* (2006.01)

(56) References Cited

U.S. PATENT DOCUMENTS

| | | |
|---|---|---|
| 2008/0303479 A1 | 12/2008 | Park et al. |
| 2009/0195214 A1 | 8/2009 | Gehrke et al. |
| 2010/0052869 A1 | 3/2010 | Stewart |
| 2010/0084467 A1 | 4/2010 | Nishido |
| 2010/0146308 A1 | 6/2010 | Gioscia et al. |
| 2011/0053500 A1 | 3/2011 | Menegoli et al. |
| 2011/0215756 A1 | 9/2011 | Shimizu |
| 2011/0278948 A1 | 11/2011 | Forsell |
| 2012/0050931 A1* | 3/2012 | Terry et al. .................. 361/91.5 |
| 2012/0161697 A1 | 6/2012 | Park et al. |
| 2012/0200967 A1 | 8/2012 | Mikolajczak |
| 2012/0223591 A1 | 9/2012 | Cheon et al. |
| 2012/0293009 A1* | 11/2012 | Kim et al. .................... 307/104 |
| 2013/0020876 A1 | 1/2013 | Kim et al. |
| 2013/0099585 A1 | 4/2013 | Von Novak et al. |

FOREIGN PATENT DOCUMENTS

| | | |
|---|---|---|
| WO | 2008044875 A1 | 4/2008 |
| WO | WO-2010025150 A1 | 3/2010 |
| WO | 2010119772 A1 | 10/2010 |

OTHER PUBLICATIONS

International Search Report and Written Opinion—PCT/US2013/056241—ISA/EPO—Jul. 22, 2014.

* cited by examiner

WIRELESS POWER OVERVOLTAGE PROTECTION CIRCUIT WITH REDUCED POWER DISSIPATION

RELATED APPLICATIONS

This application claims priority to and the benefit of Provisional Application No. 61/694,712 filed on Aug. 29, 2012 in the U.S. Patent and Trademark Office, the entire contents of which are incorporated herein by reference.

TECHNICAL FIELD

The described technology generally relates to wireless power. More specifically, the disclosure is directed to an overvoltage protection circuit with reduced power dissipation for a wireless power receiver.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems are capable of transferring power in free space to be used to charge rechargeable electronic devices or provide power to electronic devices, and thus they may overcome some of the deficiencies of wired charging solutions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims.

One aspect is a wireless power receiver apparatus, comprising: an antenna circuit configured to wirelessly receive power, from a transmitter, at a level sufficient to power or charge a load, wherein the antenna circuit is electrically connected to an overvoltage protection circuit that is electrically connected between the antenna circuit and the load; a matching circuit electrically connected to the antenna circuit; and a switching element electrically connected to the matching circuit, wherein at least one of the matching circuit or the switching element is configured to control an amount of the received power flowing into the overvoltage protection circuit.

Another aspect is a method of operating a wireless power receiver apparatus, comprising: wirelessly receiving power, from a transmitter, at a level sufficient to power or charge a load, the load coupled to an overvoltage protection circuit; and controlling an amount of the received power flowing into the overvoltage protection circuit.

Another aspect is one or more processor-readable storage devices having processor-readable code embodied on the processor-readable storage devices, the processor-readable code for programming one or more processors to perform a method of operating a wireless power receiver apparatus, the method comprising: wirelessly receiving power, from a transmitter, at a level sufficient to power or charge a load, the load coupled to an overvoltage protection circuit; and controlling an amount of the received power flowing into the overvoltage protection circuit.

Another aspect is a wireless power receiver apparatus, comprising: means for wirelessly receiving power, from a transmitter, at a level sufficient to power or charge a load, the load coupled to an overvoltage protection circuit; and means for controlling an amount of the received power flowing into the overvoltage protection circuit.

Another aspect is a processing apparatus, comprising: a memory; and a processor coupled to the memory, the processor being configured to wirelessly receive power, from a transmitter, at a level sufficient to power or charge a load, the load coupled to an overvoltage protection circuit; and control an amount of the received power flowing into the overvoltage protection circuit.

Figure 1:
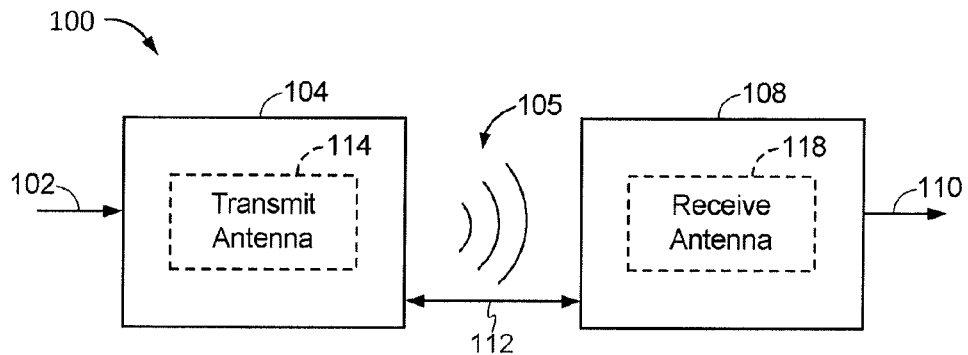
FIG. 1 is a functional block diagram of a wireless power transfer system in accordance with one exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receive antenna" to achieve power transfer.

FIG. 1 is a functional block diagram of a wireless power transfer system 100 in accordance with one exemplary implementation. Input power 102 may be provided to a transmitter 104 from a power source (not shown) to generate a field 105 for performing energy transfer. A receiver 108 may couple to the field 105 and generate output power 110 for storing or consumption by a device (not shown) coupled to the output power 110. Both the transmitter 104 and the receiver 108 are separated by a distance 112.

In one exemplary implementation, the transmitter 104 and receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the energy field 105 produced by the transmitter 104. The field 105 corresponds to a region where energy output by the transmitter 104 may be captured by the receiver 108. The field 105 may correspond to the "near-field" of the transmitter 104 as will be further described below. The transmitter 104 may include a transmit antenna 114 for transmitting energy to the receiver 108. The receiver 108 may include a receive antenna 118 for receiving or capturing energy transmitted from the transmitter 104. The near-field may correspond to a region in which there are strong reactive fields resulting from the currents and charges in the transmit antenna 114 that minimally radiate power away from the transmit antenna 114. The near-field may correspond to a region that is within about one wavelength (or a fraction thereof) of the transmit antenna 114, or in some implementations it may be within a distance of less than about 5 meters. In other implementations, the near-field may be within a distance of less than about 10 meters, and in some implementations at or greater than 10 meters.

The transmit and receive antennas 114 and 118 may be sized according to applications and devices to be associated therewith. As described above, efficient energy transfer may occur by coupling a large portion of the energy in the field 105 of the transmit antenna 114 to the receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
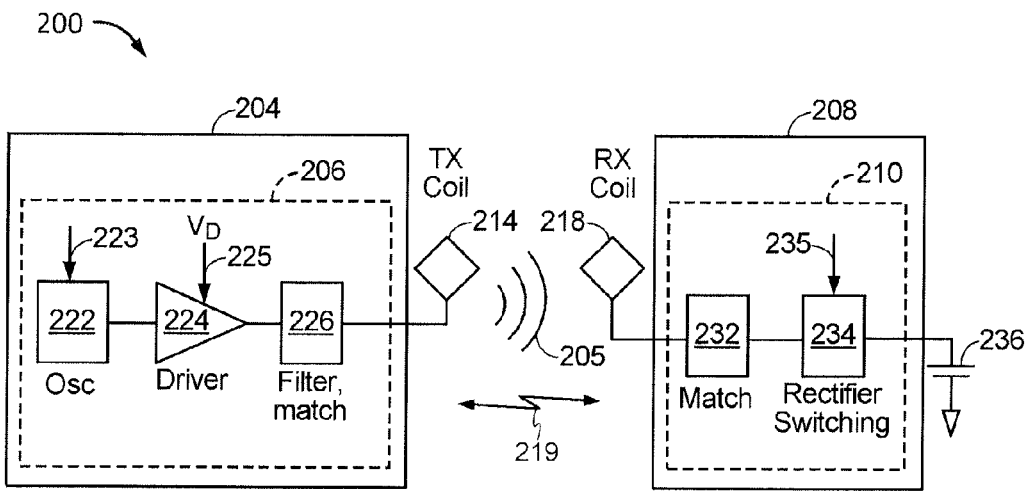
FIG. 2 is a functional block diagram of a wireless power transfer system in accordance with another exemplary implementation.

FIG. 2 is a functional block diagram of a wireless power transfer system 200 in accordance with another exemplary implementation. The system 200 includes a transmitter 204 and a receiver 208. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to the driver circuit 224 which is configured to drive the transmit antenna 214 at, for example, a resonant frequency of the transmit antenna 214 based on an input voltage signal ($V_D$) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device located at or near the receiver 208. As one example, the power provided may be, for example, on the order of about 300 milli-Watts to about 5 Watts to power or charge different devices with different power requirements. Higher or lower power levels may also be provided.

The receiver 208 may include receive circuitry 210 that may include a matching circuit 232 and a rectifier and switching circuit 234. The matching circuit 232 may match the impedance of the receive circuitry 210 to the receive antenna 218. The rectifier and switching circuit 234 may generate a direct current (DC) power output from an alternate current (AC) power input to charge a battery 236 as shown in FIG. 2 or to power a device (not shown) coupled to the receiver 208 based on an input signal 235. The receiver 208 and transmitter 204 may additionally communicate on a separate communication channel 219 (e.g., Bluetooth, Zigbee, cellular, etc). The receiver 208 and transmitter 204 may alternatively communicate via in-band signaling using characteristics of a wireless field 205.

As described more fully below, the receiver 208, that may initially have a selectively disablable associated load (e.g., battery 236), may be configured to determine whether an amount of the power transmitted by the transmitter 204 and received by the receiver 208 is appropriate for charging the battery 236. Further, the receiver 208 may be configured to enable a load (e.g., battery 236) upon determining that the amount of the power is appropriate. In some implementations, the receiver 208 may be configured to directly utilize power received from a wireless power transfer field without charging the battery 236. For example, a communication device, such as a near-field communication (NFC) or radio-frequency identification device (RFID) may be configured to receive power from a wireless power transfer field and communicate by interacting with the wireless power transfer field and/or utilize the received power to communicate with the transmitter 204 or other devices.

Figure 3:
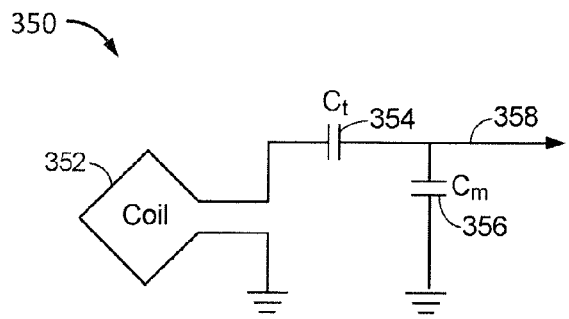
FIG. 3 is a schematic diagram of a portion of transmit circuitry or receive circuitry of FIG. 2 including a transmit or receive antenna in accordance with exemplary implementations.

FIG. 3 is a schematic diagram of a portion of the transmit circuitry 206 or receive circuitry 210 of FIG. 2 in accordance with exemplary implementations. As illustrated in FIG. 3, the transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 may be more powerful.

As stated, efficient transfer of energy between the transmitter 104/204 and receiver 108/208 may occur during matched or nearly matched resonance between the transmitter 104/204 and the receiver 108/208. However, even when resonance between the transmitter 104/204 and receiver 108/208 are not matched, energy may be transferred, although the efficiency may be affected. For example, the efficiency may be less when resonance is not matched. Transfer of energy occurs by coupling energy from the field 105/205 of the transmit antenna 114/214 to the receive antenna 118/218 residing in the neighborhood where this field 105/205 is established rather than propagating the energy from the transmit antenna 114/214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358 with a frequency that substantially corresponds to the resonant frequency of the antenna 352 may be an input to the antenna 352.

Referring to FIGS. 1 and 2, the transmitter 104/204 may output a time varying magnetic field with a frequency corresponding to the resonant frequency of the transmit antenna 114/214. When the receiver 108/208 is within the field 105/205, the time varying magnetic field may induce a current in the receive antenna 118/218. As described above, if the receive antenna 118/218 is configured to be resonant at the frequency of the transmit antenna 114/214, energy may be efficiently transferred. The AC signal induced in the receive antenna 118/218 may be rectified as described above to produce a DC signal that may be provided to charge or to power a load.

Figure 4:
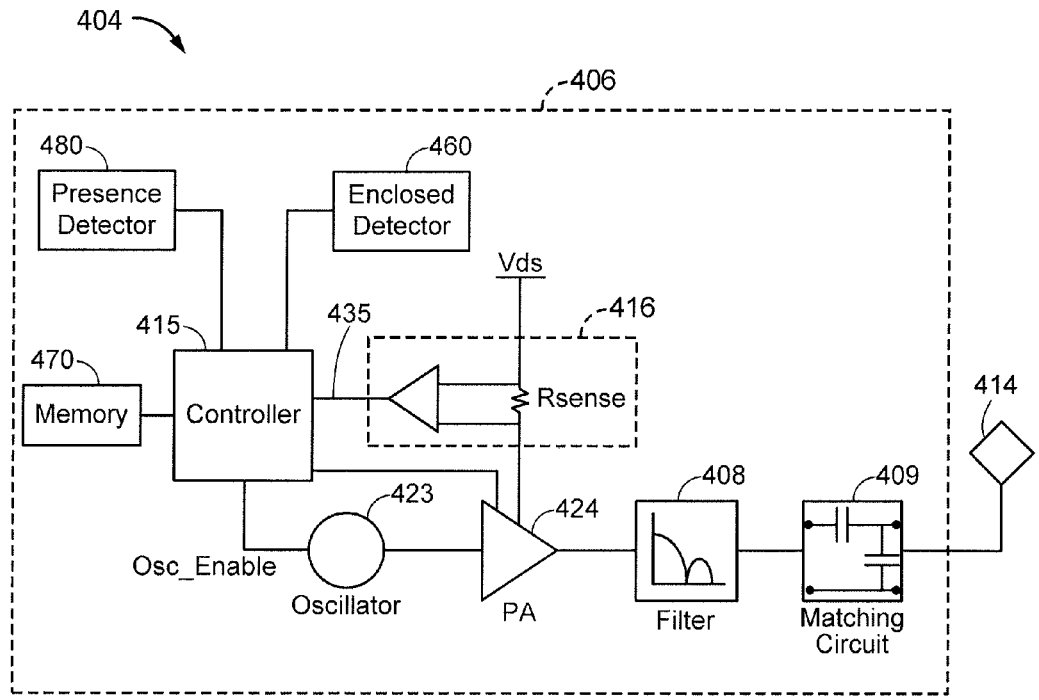
FIG. 4 is a functional block diagram of a transmitter that may be used in the wireless power transfer system of FIG. 1 in accordance with exemplary implementations.

FIG. 4 is a functional block diagram of a transmitter 404 that may be used in the wireless power transfer system 100 of FIG. 1 in accordance with exemplary implementations. The transmitter 404 may include transmit circuitry 406 and a transmit antenna 414. The transmit antenna 414 may be the same as the antenna 352 as shown in FIG. 3. The transmit circuitry 406 may provide RF power to the transmit antenna 414 by providing an oscillating signal resulting in generation of energy (e.g., magnetic flux) about the transmit antenna 414. The transmitter 404 may operate at any suitable frequency. By way of example, the transmitter 404 may operate at the 6.78 MHz ISM band.

The transmit circuitry 406 may include a fixed impedance matching circuit 409 for matching the impedance of the transmit circuitry 406 (e.g., about 50 ohms) to the transmit antenna 414 and a low pass filter (LPF) 408 configured to reduce harmonic emissions to levels to prevent self-jamming of devices coupled to the receiver 108/208. Other exemplary implementations may include different filter topologies, including but not limited to, notch filters that attenuate specific frequencies while passing others and may include an adaptive impedance match, that may be varied based on measurable transmit metrics, such as output power to the antenna 414 or DC current drawn by a driver circuit 424.

The transmit circuitry 406 may further include the driver circuit 424 configured to drive an RF signal as determined by an oscillator 423. The transmit circuitry 406 may include discrete devices or circuits, or alternately, may include an integrated assembly. An exemplary RF power output from the transmit antenna 414 may be on the order of about 2.5 Watts.

The transmit circuitry 406 may also include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by the transmit antenna 414. By way of example, the load sensing circuit 416 monitors the current flowing to the driver circuit 424, that may be affected by the presence or absence of active receivers in the vicinity of the field generated by the transmit antenna 414 as will be further described below. Detection of changes to the loading on the driver circuit 424 are monitored by the controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of the transmit antenna 414 may be "electrically small" (e.g., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, a memory 470, or a combination thereof, connected to the controller 415

The controller 415 may adjust an amount of the power delivered by the driver circuit 424 in response to presence signals from the presence detector 480 and the enclosed detector 460. The transmitter 404 may receive power through a number of power sources, such as, for example, an AC-DC converter (not shown) to convert an AC power present in a building, a DC-DC converter (not shown) to convert a DC power source to a voltage suitable for the transmitter 404, or directly from a DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary implementations, there may be regulations limiting the amount of power that the transmit antenna 414 may transmit at a specific frequency. In some cases, these regulations are meant to protect humans from electromagnetic radiation. However, there may be environments where the transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When the transmitter 404 is in an enclosure that is in an enclosed state, a power level of the transmitter may be increased.

In exemplary implementations, a method by which the transmitter 404 does not remain turned on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal, sent from either the repeater or the receive antenna 118/218, indicating that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
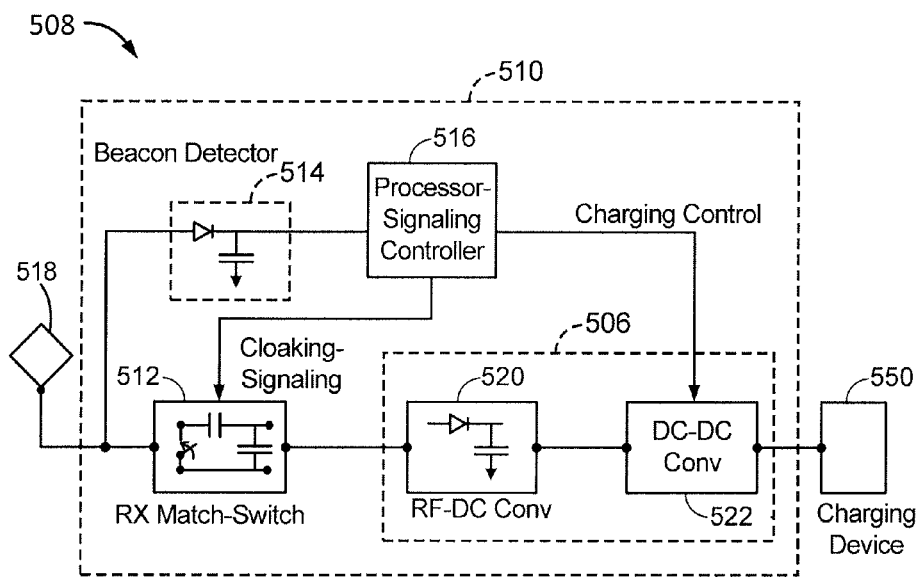
FIG. 5 is a functional block diagram of a receiver that may be used in the wireless power transfer system of FIG. 1 in accordance with exemplary implementations.

FIG. 5 is a functional block diagram of a receiver 508 that may be used in the wireless power transfer system 100 of FIG. 1 in accordance with exemplary implementations. The receiver 508 includes receive circuitry 510 that may include a receive antenna 518. The receiver 508 may couple to a charging device 550 for providing received power thereto. It should be noted that the receiver 508 is illustrated as being external to the device 550 but may be integrated into the device 550. Energy may be propagated wirelessly to the receive antenna 518 and then coupled through the rest of the receive circuitry 510 to the device 550. By way of example, the charging device 550 may include devices such as mobile phones, portable music players, laptop computers, tablet computers, computer peripheral devices, communication devices (e.g., Bluetooth devices), digital cameras, hearing aids (an other medical devices), and the like.

The receive antenna 518 may be tuned to resonate at the same frequency, or within a specified range of frequencies, as the transmit antenna 414 (FIG. 4). The receive antenna 518 may be similarly dimensioned with the transmit antenna 414 or may be differently sized based upon the dimensions of the associated device 550. By way of example, the device 550 may be a portable electronic device having diametric or length dimension smaller than the diameter or length of the transmit antenna 414. In such an example, the receive antenna 518 may be implemented as a multi-turn coil in order to reduce the capacitance value of a tuning capacitor (not shown) and increase the receive coil's impedance. By way of example, the receive antenna 518 may be placed around the substantial circumference of the device 550 in order to maximize the antenna diameter and reduce the number of loop turns (i.e., windings) of the receive antenna 518 and the inter-winding capacitance.

The receive circuitry 510 may provide an impedance match to the receive antenna 518. The receive circuitry 510 includes power conversion circuitry 506 for converting a received RF energy source into charging power for use by the device 550. The power conversion circuitry 506 may include an RF-to-DC converter 520 and a DC-to-DC converter 522. The RF-to-DC converter 520 rectifies the RF energy signal received at the receive antenna 518 into a non-alternating power with an output voltage represented by $V_{rect}$. The DC-to-DC converter 522 (or other power regulator) converts the rectified RF energy signal into an energy potential (e.g., voltage) that is compatible with the device 550 with an output voltage and output current represented by $V_{out}$ and $I_{out}$. Various RF-to-DC converters are contemplated, including partial and full rectifiers, regulators, bridges, doublers, as well as linear and switching converters.

The receive circuitry 510 may further include switching circuitry 512 for connecting the receive antenna 518 to the power conversion circuitry 506 or alternatively for disconnecting the power conversion circuitry 506. Disconnecting the receive antenna 518 from the power conversion circuitry 506 not only suspends charging of the device 550, but also changes the "load" as "seen" by the transmitter 404.

As disclosed above, the transmitter 404 includes the load sensing circuit 416 that may detect fluctuations in the bias current provided to the transmitter driver circuit 424. Accordingly, the transmitter 404 has a mechanism for determining whether receivers are present in the transmitter's near-field.

When multiple receivers 508 are present in a transmitter's near-field, it may be desirable to time-multiplex the loading and unloading of one or more receivers to enable other receivers to more efficiently couple to the transmitter. The receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by the receiver 508 and detected by the transmitter 404 may provide a communication mechanism from the receiver 508 to the transmitter 404 as is explained more fully below. Additionally, a protocol may be associated with the switching that enables the sending of a message from the receiver 508 to the transmitter 404. By way of example, a switching speed may be on the order of about 100 μsec.

In an exemplary implementation, communication between the transmitter 404 and the receiver 508 refers to a device sensing and charging control mechanism, rather than typical two-way communication (i.e., in band signaling using the coupling field). In other words, the transmitter 404 may use on/off keying of the transmitted signal to adjust an energy that is available in the near-field. The receiver 508 may interpret these changes in energy as a message from the transmitter 404. The receiver 508 may use tuning and de-tuning of the receive antenna 518 to adjust the amount of power that is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

The receive circuitry 510 may further include signaling detector and beacon circuitry 514 used to identify received energy fluctuations, that may correspond to informational signaling from the transmitter 404 to the receiver 508. Furthermore, the signaling and beacon circuitry 514 may also be used to detect the transmission of a reduced RF signal energy (i.e., a beacon signal) and to rectify the reduced RF signal energy into a nominal power for awakening either un-powered or power-depleted circuits within the receive circuitry 510 in order to configure the receive circuitry 510 for wireless charging.

The receive circuitry 510 may further include a processor 516 for coordinating the processes of the receiver 508 described herein including the control of switching circuitry 512 described herein. Cloaking of the receiver 508 may also occur upon the occurrence of other events including detection of an external wired charging source (e.g., wall/USB power) providing charging power to the device 550. The processor 516, in addition to controlling the cloaking of the receiver 508, may also monitor the beacon circuitry 514 to determine a beacon state and extract messages sent from the transmitter 404. The processor 516 may also adjust the DC-to-DC converter 522 for improved performance.

An overvoltage protection circuit may be included on wireless power receivers to protect the receivers from harmful voltages. An overvoltage condition may be induced, for example, when the product of the coupled impedance of a transmitter-receiver pair, and transmitter antenna current exceeds the design threshold of the receiver. This may occur due to the placement of the receiver in an invalid location. In some implementations, the receiver requests that the transmitter shutdown after an overvoltage condition is detected. However, RF energy contributed by high utilization of uncoordinated radios, or other uncontrollable environmental factors may block communication between the receiver and transmitter. If the communication is blocked for long periods, and the transmitter does not shutdown, the overvoltage circuit may be damaged.

Implementations described herein provide for allowing an overvoltage protection (OVP) circuit to tolerate extended, or even indefinite overvoltage events. In one implementation, an OVP circuit is provided with reduced power dissipation. At least one implementation controls an amount of the power, received from the transmitter, flowing into the OVP circuit to protect the OVP circuit against an overvoltage condition.

Figure 6:
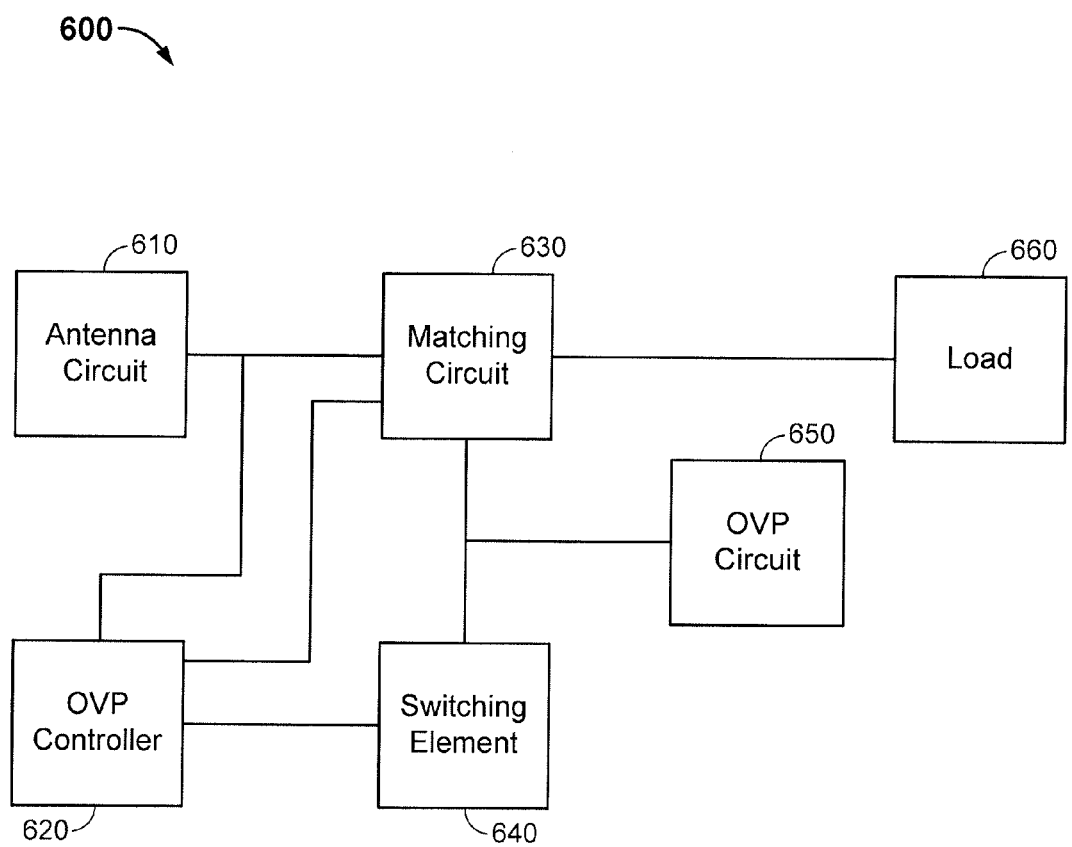
FIG. 6 is a block diagram of a wireless power receiver for protecting an overvoltage protection (OVP) circuit included therein in accordance with one exemplary implementation.

FIG. 6 is a block diagram of a wireless power receiver 600 for protecting an OVP circuit included therein in accordance with one exemplary implementation. The receiver 600 includes an antenna circuit 610, an OVP controller 620, a matching circuit 630, a switching element 640, an OVP circuit 650 and a load 660. Depending on the implementation, certain elements/blocks may be removed from or additional elements/blocks may be added to the receiver 600 illustrated in FIG. 6. Furthermore, two or more elements/blocks may be combined into a single element/block, or a single element/block may be realized as multiple elements/blocks. This applies to the implementations shown in FIGS. 7-9.

The antenna circuit 610 wirelessly receives power at a level sufficient to power or charge the load 660 from a transmitter such as the transmitter 404. The antenna circuit 610 is electrically connected to the OVP circuit 650. In some implementations, the load 660 includes at least one of a rectifier, a DC-to-DC converter or a battery.

The matching circuit 630 is coupled to the antenna circuit 610. In some implementations, the matching circuit 630 is coupled between the switching element 640 and the load 660. The matching circuit 630 may include at least two components, and the switching element 640 may be coupled between two of the at least two components. The matching circuit 630 may include at least one capacitive component such as a capacitor. The matching circuit 630 may limit the maximum current flowing into the switching element 640. The matching circuit 630 may also limit the impedance transformation caused by the shunt capacitance of the switching element 640.

The switching element 640 may be coupled to the matching circuit 630. The switching element 640 may include a field effect transistor (FET) including, but not limited to, a junction FET (JFET), a metal-semiconductor FET (MESFET), a modulation-doped FET (MODFET), a metal-oxide-semiconductor FET (MOSFET), an n-channel MOSFET (NMOSFET), a p-channel MOSFET (PMOSFET) and an organic FET (OFET). The switching element 640 may also include bipolar transistors. The switching element 640 may further include other switching devices such as digital or analog switches or a relay.

Figure 7:
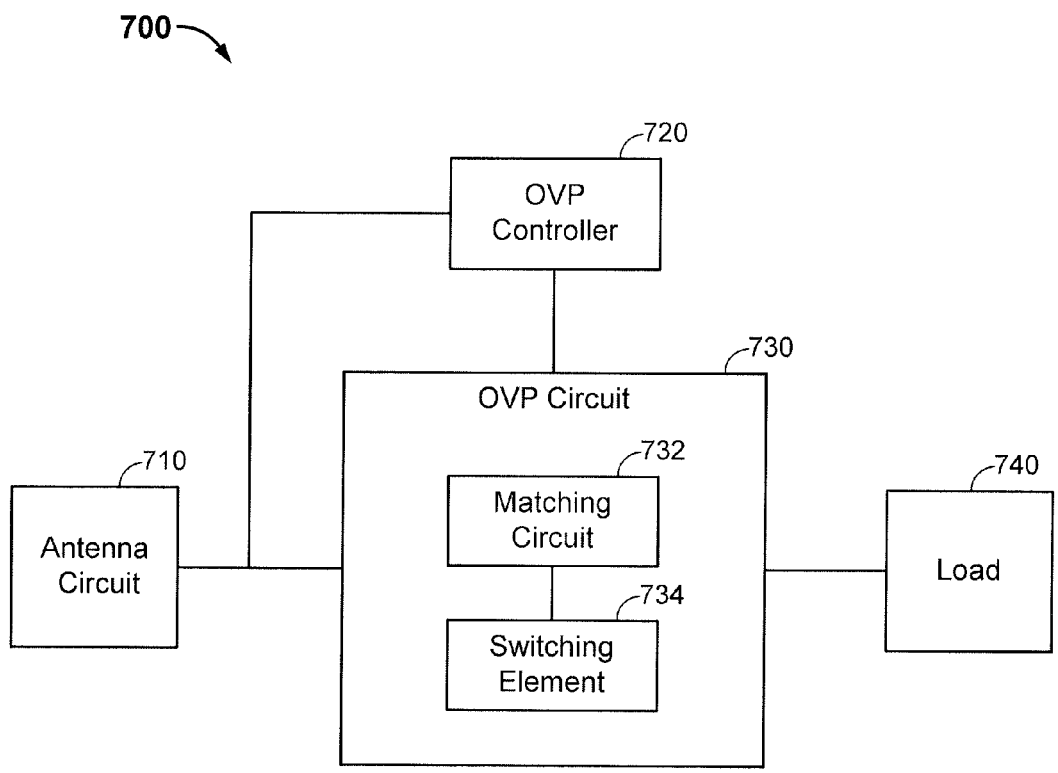
FIG. 7 is a block diagram of a wireless power receiver for protecting an OVP circuit included therein in accordance with another exemplary implementation.
Figure 8:
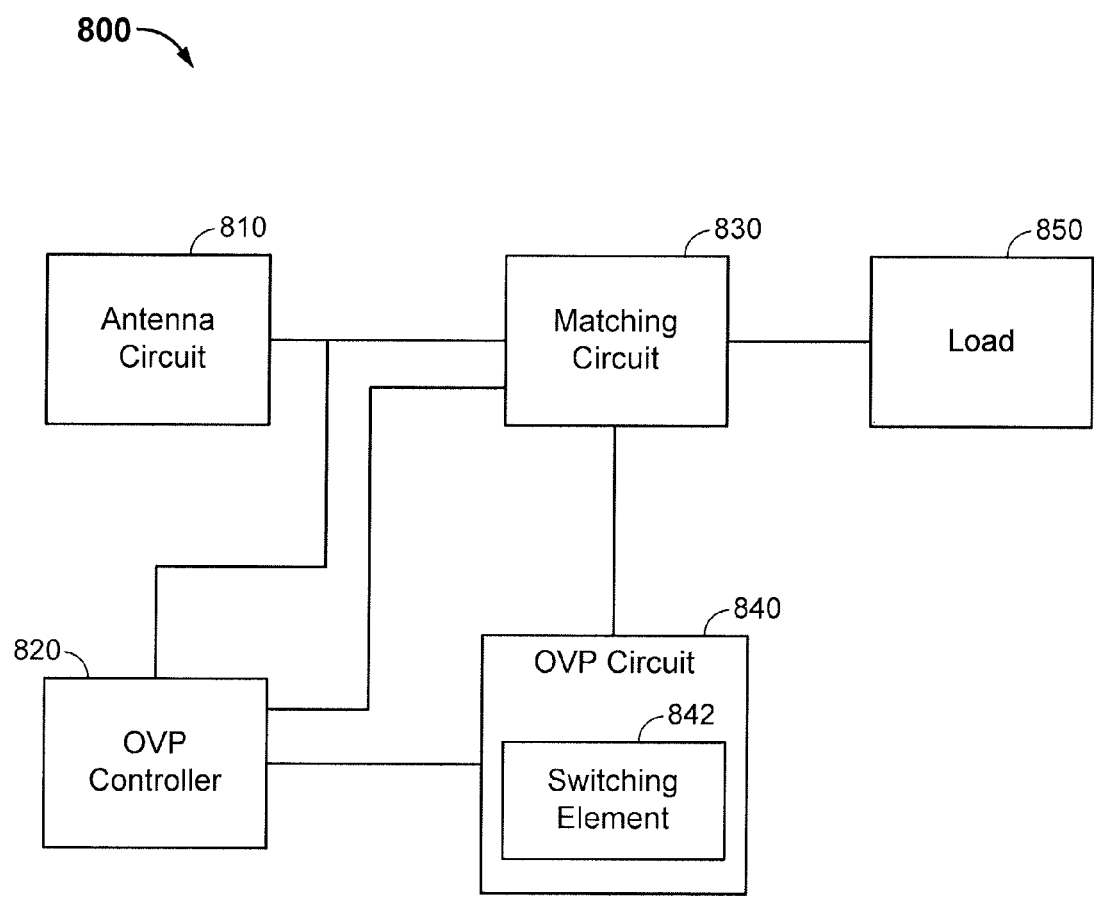
FIG. 8 is a block diagram of a wireless power receiver for protecting an OVP circuit included therein in accordance with another exemplary implementation.
Figure 9:
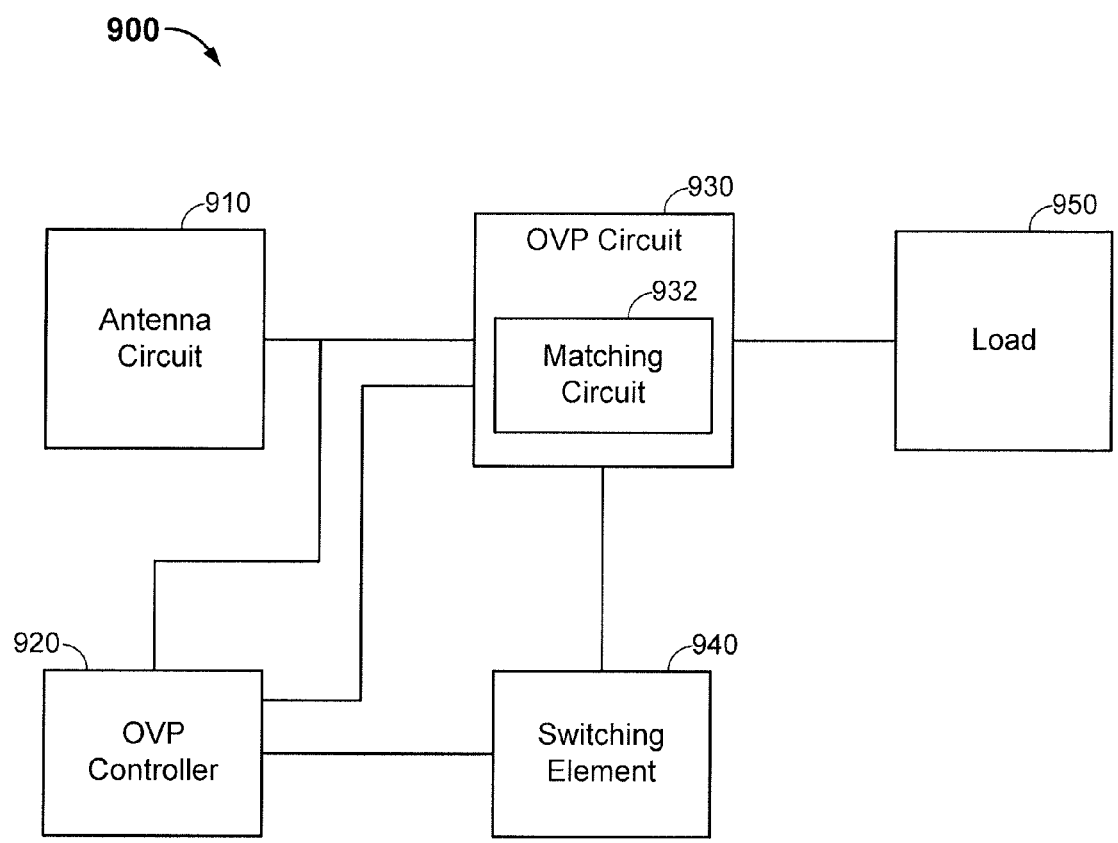
FIG. 9 is a block diagram of a wireless power receiver for protecting an OVP circuit included therein in accordance with another exemplary implementation.

In some implementations, at least one of the matching circuit 630 or the switching element 640 is configured to control an amount of the received power flowing into the OVP circuit 650. The power may include at least one of the following: voltage, current or heat. Furthermore, at least one of the two elements 630 and 640 may be configured to protect the OVP circuit 650 against an overvoltage condition. For example, the at least one element may control or reduce power dissipation (e.g., heat) to be generated at the OVP circuit 650. The OVP circuit 650 may include at least one of the matching circuit 630 or the switching element 640 therein as shown in FIGS. 7-9.

The OVP circuit 650 is coupled between the antenna circuit 610 and the load 660. The OVP circuit 650 may protect the receiver 600 from high voltages induced on the antenna circuit 610 by a transmitter. The OVP circuit 650 may also notify the transmitter of the overvoltage condition so that the transmitter 404 can remove the overvoltage condition by, for example, shutting down itself. As an example, when an overvoltage condition is detected, the OVP circuit 650 may activate switches to clamp the receiver 600 and change the circuit's impedance to reduce current flow. However, as described above, in certain situations where communication between the receiver and transmitter is blocked, the overvoltage circuit and/or the entire receiver may still be damaged.

The OVP controller 620 may detect an overvoltage condition in the receiver 600. In some implementations, the OVP controller 620 determines that the overvoltage condition has occurred when a voltage detected in the antenna circuit 610 is greater than a threshold voltage. The OVP controller 620 may determine that the overvoltage condition has occurred when the detected voltage remains to be greater than the threshold voltage for a predetermined period of time. The OVP controller 620 may also measure a voltage received by the receiver 600 to determine whether the overvoltage condition has occurred. The OVP controller 620 may determine when the overvoltage condition has passed. In some implementations, the OVP controller 620 controls the OVP circuit 650 to generate the appropriate messages to be sent to the transmitter.

In one implementation, the OVP circuit 650 and the OVP controller 620 are realized as the switching and signaling circuitry and the OVP/signaling controller, respectively, that are disclosed in U.S. patent application Ser. No. 13/622,204 filed on Sep. 18, 2012, the entire contents of which are incorporated herein by reference. In another implementation, the OVP circuit 650 may include at least some components, or may perform at least some functionality, of the switching and signaling circuitry. Furthermore, the OVP controller 620 may include at least some components, or may perform at least some functionality, of the OVP/signaling controller. This applies to the implementations of FIGS. 7-9.

FIG. 7 is a block diagram of a wireless power receiver 700 for protecting an OVP circuit included therein in accordance with another exemplary implementation. The receiver 700 includes an antenna circuit 710, an OVP controller 720, an OVP circuit 730 and a load 740. The OVP circuit includes a matching circuit 732 and a switching element 734. The FIG. 7 implementation is similar to the FIG. 6 implementation, a difference being that the matching circuit 732 and the switching element 734 are incorporated into the OVP circuit 730, and thus description of the operation thereof will be omitted.

FIG. 8 is a block diagram of a wireless power receiver 800 for protecting an OVP circuit included therein in accordance with another exemplary implementation. The receiver 800 includes an antenna circuit 810, an OVP controller 820, a matching circuit 830, an OVP circuit 840 and a load 850. The OVP circuit 840 includes a switching element 842. The FIG. 8 implementation is similar to the FIG. 6 implementation, a difference being that the switching element 842 is incorporated into the OVP circuit 840, and thus description of the operation thereof will be omitted.

FIG. 9 is a block diagram of a wireless power receiver 900 for protecting an overvoltage protection (OVP) circuit included therein in accordance with another exemplary implementation. The receiver 900 includes an antenna circuit 910, an OVP controller 920, an OVP circuit 930, a switching element 940 and a load 950. The OVP circuit 930 includes a matching circuit 932. The FIG. 9 implementation is similar to the FIG. 6 implementation, a difference being that the matching circuit 932 is incorporated into the OVP circuit 930, and thus description of the operation thereof will be omitted.

Figure 10:
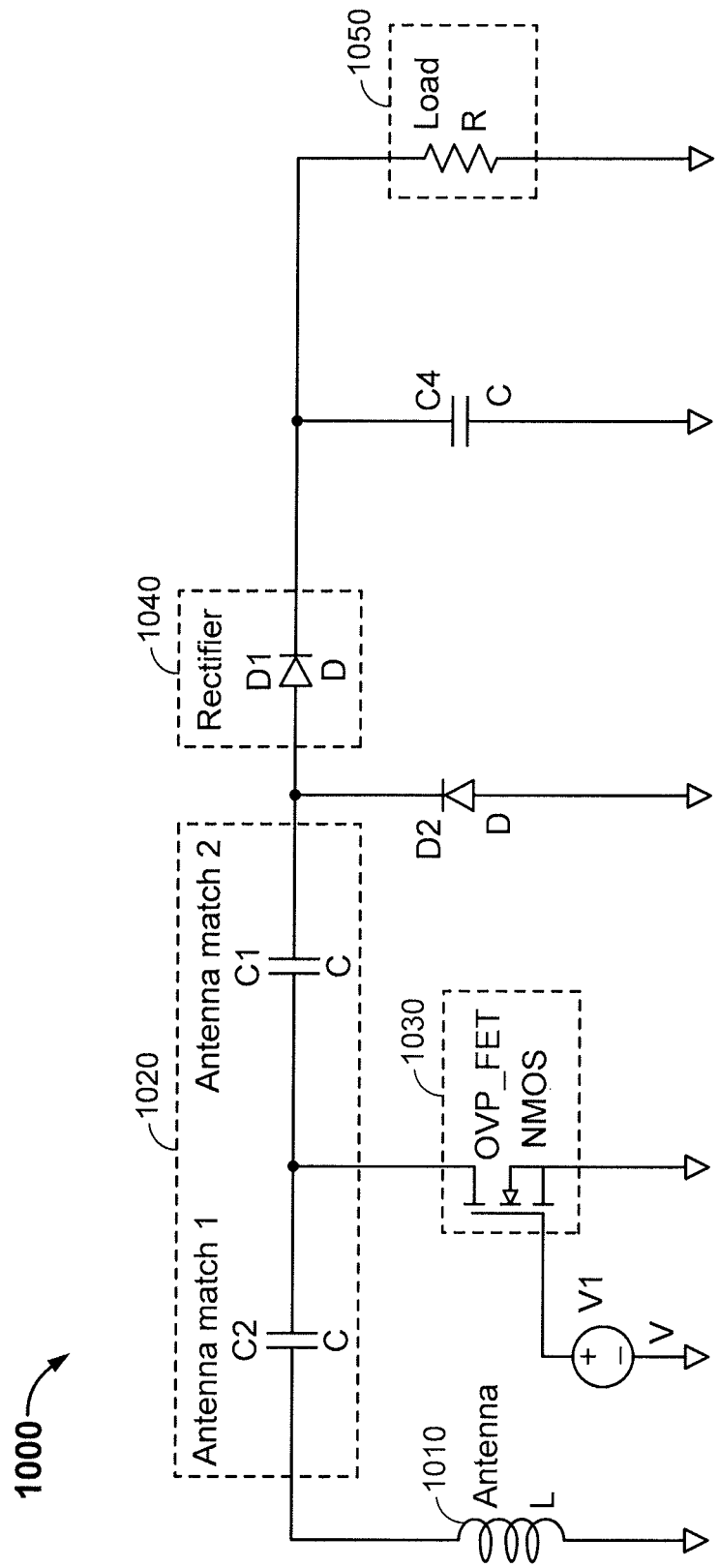
FIG. 10 is a schematic diagram of a wireless power receiver for protecting an OVP circuit included therein in accordance with another exemplary implementation.

FIG. 10 is a schematic diagram of a wireless power receiver 1000 for protecting an OVP circuit included therein in accordance with another exemplary implementation. For the purpose of convenience, certain receiver elements such as an OVP controller and an OVP circuit are not shown in FIG. 10 as well as FIGS. 11-13. In some implementations, the receiver 1000 includes an antenna circuit 1010, a matching circuit 1020, a switching element 1030, a rectifier 1040 and a load 1050. The rectifier 1040 may function as a load. Depending on the implementation, certain electrical components (such as a transistor, resistor, inductor, capacitor and/or equivalent circuits thereof) may be removed from or additional electrical components may be added to the receiver 1000 illustrated in FIG. 10. This applies to the implementations shown in FIGS. 11-13.

In some implementations, the matching circuit 1020 includes first and second capacitors (C1, C2). The switching element 1030 may include an FET for an OVP circuit (hereinafter, to be interchangeably used with an OVP FET) such as an NMOS FET. However, as discussed above, other types of FET can also be used. The OVP FET 1030 may be connected between the two capacitors (C1, C2). The capacitors (C1, C2) may limit the maximum current flowing in the OVP FET 1030. High current can overheat and damage the switching element 1030. If the OVP FET is damaged, an OVP circuit (not shown in FIG. 10), the entire receiver 1000 and corresponding loads 1040 and 1050 may also be damaged. Since the capacitors (C1, C2) can limit the maximum current flowing in the switching element 1030, the OVP circuit as well as the receiver 1000 and loads 1040 and 1050 can be protected against an overvoltage condition such as a high power (high current, high voltage and/or high heat).

The capacitors (C1, C2) may also limit the impedance transformation caused by the shunt capacitance of the OVP FET 1030. Generally, the closer the OVP FET 1030 is connected to the resonator terminals of the antenna circuit 1010, the greater the transformation caused by the shunt capacitance. If the switching element 1030 had about zero (0) pF shunt capacitance, this may not be a consideration. However, it may be difficult to design switches with a shunt capacitance that approaches zero (0) pF.

The capacitors (C1, C2) may reduce the reactance seen from the loads 1040 and 1050 to optimize power transfer. For a given transmitter coil current and transmitter-receiver coupling, maximum power transfer may occur when the receiver 1000 is perfectly series tuned: the negative reactance of the capacitors (C1 and C2) plus the negative reactance of the rectifier 1040 equals the positive reactance of the antenna circuit 1010. However, for the same reason that this configuration enables maximum power transfer to the loads 1040 and 1050, it may also need increased dissipation in the OVP FET 1030. This increased power dissipation translates into an expensive and bulky device which dissipates a very high power. In some implementations, it may be advantageous for the loads 1040 and 1050 to see a perfectly series tuned (zero reactance) circuit while the OVP FET 1030 sees a "mistuned" (large reactance) circuit.

Figure 11:
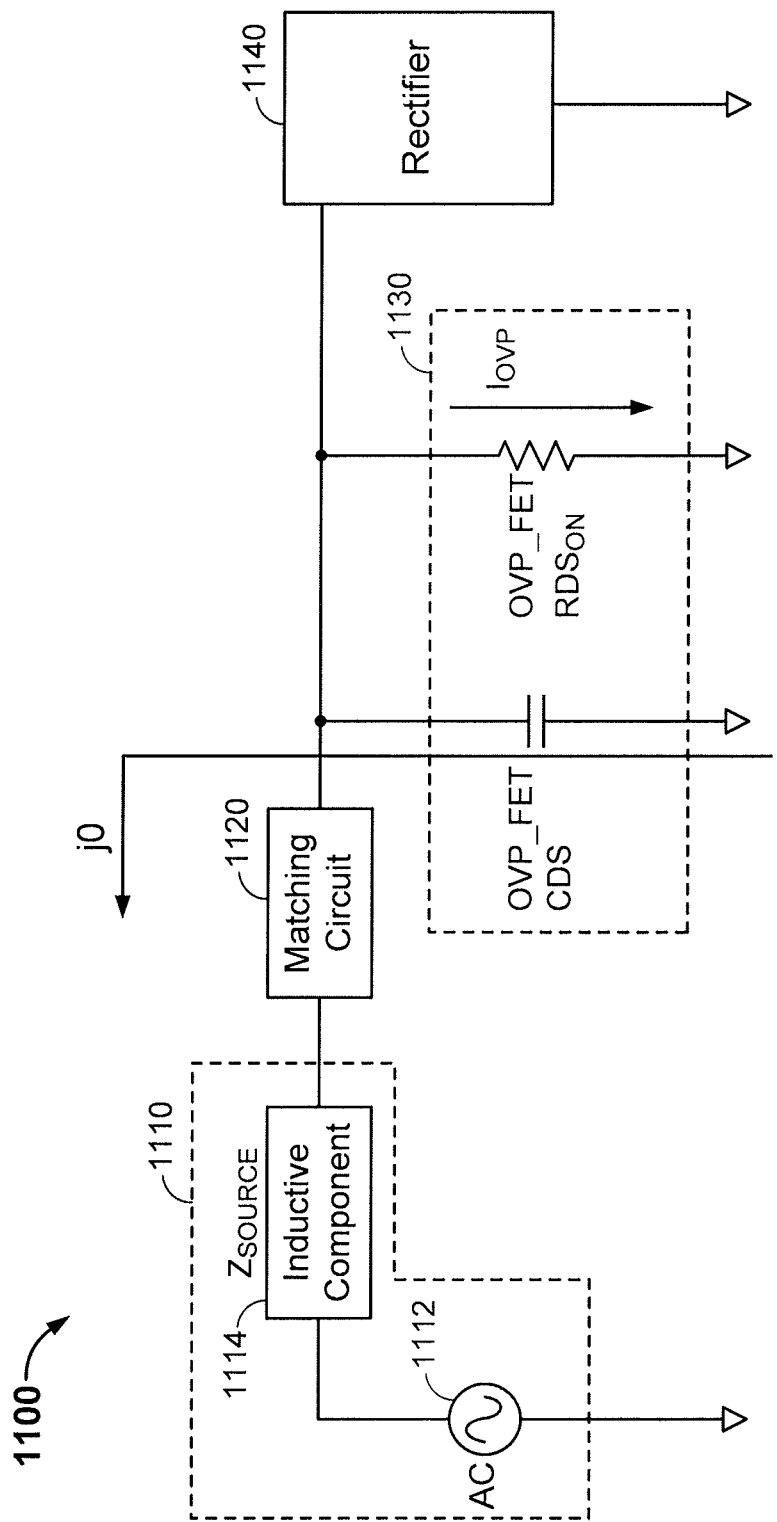
FIG. 11 is a schematic diagram of a wireless power receiver for protecting an OVP circuit included therein in accordance with another exemplary implementation.

FIG. 11 is a schematic diagram of a wireless power receiver 1100 for protecting an OVP circuit included therein in accordance with another exemplary implementation. In some implementations, the receiver 1100 includes an antenna circuit 1110, a matching circuit 1120, a switching element 1130 and a rectifier 1140. The antenna circuit 1110 may include an AC voltage generator 1112 and an inductive component 1114. In some implementations, the antenna circuit 1110 represents the receiver coil and the voltage induced on the receiver coil from the magnetic field generated by the transmitter. The AC voltage generator 1112 represents the open-circuit induced voltage. The inductive component 1114 represents the self-inductance of the receiver coil. The matching circuit 1120 may include a capacitive component such as a capacitor or equivalent capacitive circuits thereof. In one implementation, the capacitive component 1120 has a capacitive reactance value equal or substantially equal in magnitude to the reactance of the receiver coil inductance. So, the total source reactance seen by the OVP circuit 1130 may be j0 as shown in FIG. 11. In another implementation, the capacitive component 1120 may have other reactance values. The capacitive and inductive reactance values may correspond to each other in the FIG. 11 implementation as well as in the implementations of FIGS. 12 and 13.

The switching element 1130 may include an OVP FET. As discussed above, the OVP FET 1130 may be part of the OVP circuit or independent from and coupled to the OVP circuit. The OVP FET 1130 may have the drain-source capacitance (CDS) and the resistance ($RDS_{ON}$) between the drain electrode and source electrode thereof when the OVP FET 1130 is turned on (i.e., closed). The rectifier 1140 may function as a load.

In the FIG. 11 implementation, the OVP FET 1130 is connected after the matching circuit 1120. This configuration may result in a very high current through the OVP FET 1130 when it is closed as discussed below. The current ($I_{OVP}$) flowing through the OVP FET 1130 can be calculated as: $I_{OVP}=V_{AC}/(Z_{SOURCE}+RDS_{ON})$. Since $Z_{SOURCE}$ is zero (or very small) and $RDS_{ON}$ is generally designed to be very small when the OVP FET 1130 is used as a switch, the current ($I_{OVP}$) flowing through the OVP FET becomes very large as seen from the above $I_{OVP}$ equation. Furthermore, the power dissipation ($P_{OVP}$) in the OVP FET 1130 (i.e., heat generated in the OVP FET 1130) can be calculated as: $P_{OVP}=I_{OVP}^2*RDS_{ON}$ (in the foregoing equation and hereinafter, * means multiplication). Even though $RDS_{ON}$ is very small, since $I_{OVP}$ is very large, the power dissipation ($P_{OVP}$) of the OVP FET 1130 may become large as seen from the above $P_{OVP}$ equation. The very high current ($I_{OVP}$) and high dissipation ($P_{OVP}$) can damage the OVP circuit as well as the OVP FET 1130 and the receiver 1100.

When the OVP FET 1130 is open, the CDS is in parallel with $Z_{SOURCE}$ which may cause an impedance transformation. The transformed impedance ($Z_{TRANSFORM}$) can be calculated as: $Z_{TRANSFORM}=(Z_{SOURCE}*Z_{CDS})/(Z_{SOURCE}+Z_{CDS})$. In the FIG. 11 implementation, since the value of $Z_{SOURCE}$ is zero or very low, the impedance transformation ($Z_{TRANSFORM}$) caused by a typical value of CDS may be ignored. In the FIG. 11 implementation, CDS is the equivalent circuit of the FET 1130 when it is "off." $RDS_{ON}$ is the equivalent circuit when the FET 1130 is "on." CDS and RDS may not be connected in parallel. Furthermore, either CDS or RDS may be on in the FET circuit 1130 at any given time.

Figure 12:
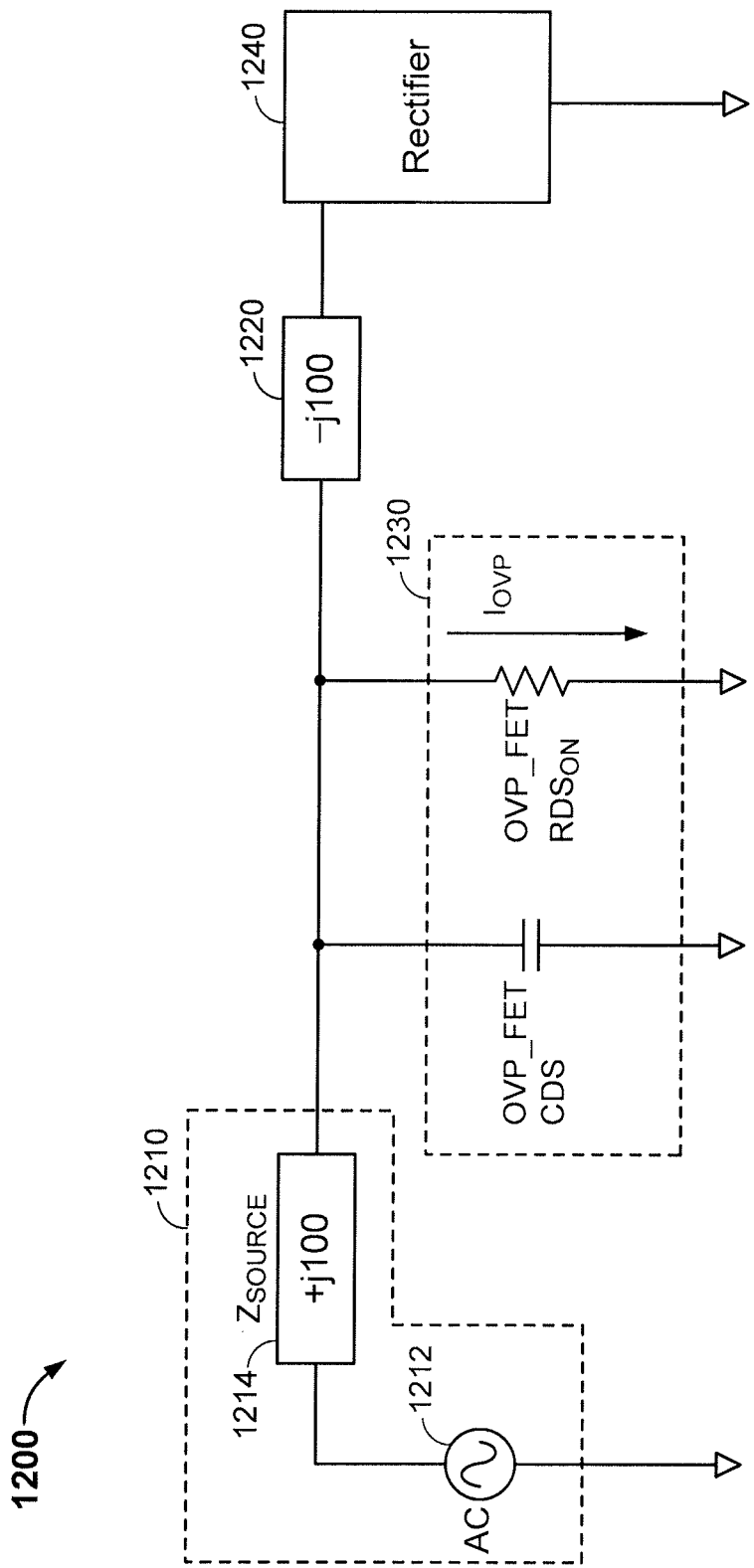
FIG. 12 is a schematic diagram of a wireless power receiver for protecting an OVP circuit included therein in accordance with another exemplary implementation.

FIG. 12 is a schematic diagram of a wireless power receiver 1200 for protecting an OVP circuit included therein in accordance with another exemplary implementation. In some implementations, the receiver 1200 includes an antenna circuit 1210, a matching circuit 1220, a switching element 1230 and a rectifier 1240. The configurations of the switching circuit 1230 and the rectifier 1240 are substantially the same as those of the FIG. 11 implementation.

The antenna circuit 1210 may include an AC voltage generator 1212 and an inductive component 1214. In one implementation, the inductive component 1214 has a reactance value of +j100 ($Z_{SOURCE}$) as shown in FIG. 12. In another implementation, the inductive component 1214 may have other reactance values (e.g., values between about +j50 and about +j100). In still another implementation, the inductive component 1214 may have a reactance value greater than about +j100 or less than about +j50.

The matching circuit 1220 may include a capacitive component. The capacitive component 1220 may include at least one capacitor. In one implementation, the capacitive component 1220 has a reactance value of -j100 as shown in FIG. 12. In another implementation, the capacitive component 1220 has other reactance values (e.g., values between about -j50 and about -j100). In still another implementation, the capacitive component 1220 has a reactance value less than about -j100 or greater than about -j50.

The OVP FET 1230 may be connected immediately after the inductive component 1214 of the antenna circuit 1210 and before the matching circuit 1220. The OVP FET 1230 may also be connected between at least two matching elements (such as capacitors) of the matching circuit 1220, for example, as shown in FIG. 10. The FIG. 12 implementation may result in a very low current through the OVP FET 1230 when it is closed, as compared to the FIG. 11 implementation. As described above, the current ($I_{OVP}$) flowing through the OVP FET 1230 can be calculated as: $I_{OVP}=V_{AC}/(Z_{SOURCE}+RDS_{ON})$. Since $Z_{SOURCE}$ is very large (e.g., about +j100) and $RDS_{ON}$ is generally very small, the current ($I_{OVP}$) flowing through the OVP FET 1230 becomes very small or significantly smaller than the OVP FET current of the FIG. 11 implementation as seen from the above $I_{OVP}$ equation. Furthermore, since $I_{OVP}$ is very small, the power dissipation ($P_{OVP}=I_{OVP}^2*RDS_{ON}$) of the OVP FET 1230 also becomes small. This is favorable because the OVP FET 1230, the OVP circuit and the receiver 1200 can be protected against an overvoltage condition by the high value of $Z_{SOURCE}$, even if the value of the voltage source ($V_{AC}$) induced at the receiver 1200 is relatively large.

As discussed above with respect to the FIG. 11 implementation, the transformed impedance ($Z_{TRANSFORM}$) can be calculated as: $Z_{TRANSFORM}=(Z_{SOURCE}*Z_{CDS})/(Z_{SOURCE}+Z_{CDS})$. In the FIG. 12 implementation, since the value of $Z_{SOURCE}$ is relatively large, the impedance transformation ($Z_{TRANSFORM}$) caused by a typical value of CDS may not be ignored. However, since the value of $Z_{SOURCE}$ is very large in the FIG. 12 implementation, the magnitude of an impedance transformation caused by a typical value of CDS may be relatively small or manageable.

Figure 13:
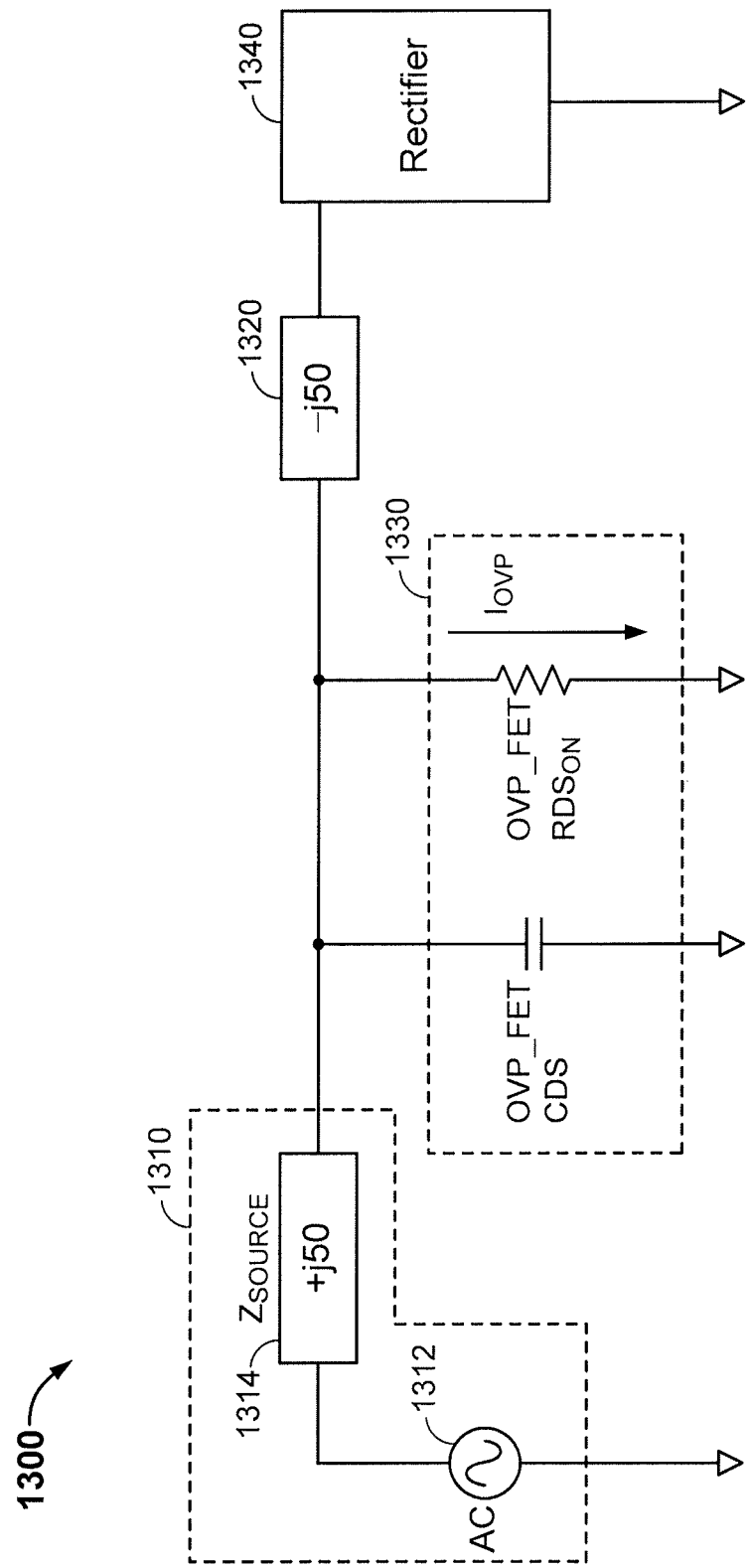
FIG. 13 is a schematic diagram of a wireless power receiver for protecting an OVP circuit included therein in accordance with another exemplary implementation.

FIG. 13 is a schematic diagram of a wireless power receiver 1300 for protecting an OVP circuit included therein in accordance with another exemplary implementation. In some implementations, the receiver 1300 includes an antenna circuit 1310, a matching circuit 1320, a switching element 1330 and a rectifier 1340. The configurations of the switching circuit 1330 and the rectifier 1340 are substantially the same as those of the FIG. 11 implementation.

The antenna circuit 1310 may include an AC voltage generator 1312 and an inductive component 1314. In one implementation, the inductive component 1314 has a reactance value of +j50 ($Z_{SOURCE}$) as shown in FIG. 13. In another implementation, the inductive component 1314 may have other reactance values (e.g., values between about +j0 and about +j50). In still another implementation, the inductive component 1314 may have a reactance value greater than about +j50.

The matching circuit 1320 may include a capacitive component such as a capacitor or other equivalent circuits thereof. In one implementation, the capacitive component 1320 has a reactance value of −j50 as shown in FIG. 12. In another implementation, the capacitive component 1320 has other reactance values (e.g., values between about −j50 and about −j0). In still another implementation, the capacitive component 1320 has a reactance value less than about −j50.

The OVP FET 1330 may be connected between at least two matching elements (such as capacitors) of the matching circuit 1320, for example, as shown in FIG. 10. The OVP FET 1330 may also be connected immediately after the inductive component 1314 of the antenna circuit 1310 and before the matching circuit 1320.

The FIG. 13 implementation may result in a low current through the OVP FET 1330 when it is closed, as compared to the FIG. 11 implementation. As described above, the current ($I_{OVP}$) flowing through the OVP FET 1330 can be calculated as: $I_{OVP} = V_{AC}/(Z_{SOURCE} + RDS_{ON})$. Since $Z_{SOURCE}$ is relatively large (e.g., about +j50) and $RDS_{ON}$ is generally very small, the current ($I_{OVP}$) flowing through the OVP FET 1230 becomes relatively small or significantly smaller than the OVP FET current of the FIG. 11 implementation as seen from the above $I_{OVP}$ equation. Furthermore, since $I_{OVP}$ is relatively small, the power dissipation ($P_{OVP} = I_{OVP}^2 * RDS_{ON}$) of the OVP FET 1330 also becomes relatively small. This is favorable because the OVP FET 1330, the OVP circuit and the receiver 1300 can be protected against an overvoltage condition such as a high source voltage ($V_{AC}$) induced at the receiver 1300.

Furthermore, the transformed impedance ($Z_{TRANSFORM}$) can be calculated as: $Z_{TRANSFORM} = (Z_{SOURCE} * Z_{CDS})/(Z_{SOURCE} + Z_{CDS})$. As in the FIG. 12 implementation, since the value of $Z_{SOURCE}$ is relatively large, the impedance transformation ($Z_{TRANSFORM}$) caused by a typical value of CDS may not be ignored. However, since the value of $Z_{SOURCE}$ is lower in the FIG. 13 implementation compared to the FIG. 12 implementation, the magnitude of an impedance transformation caused by a typical value of CDS is reduced.

Figure 14:
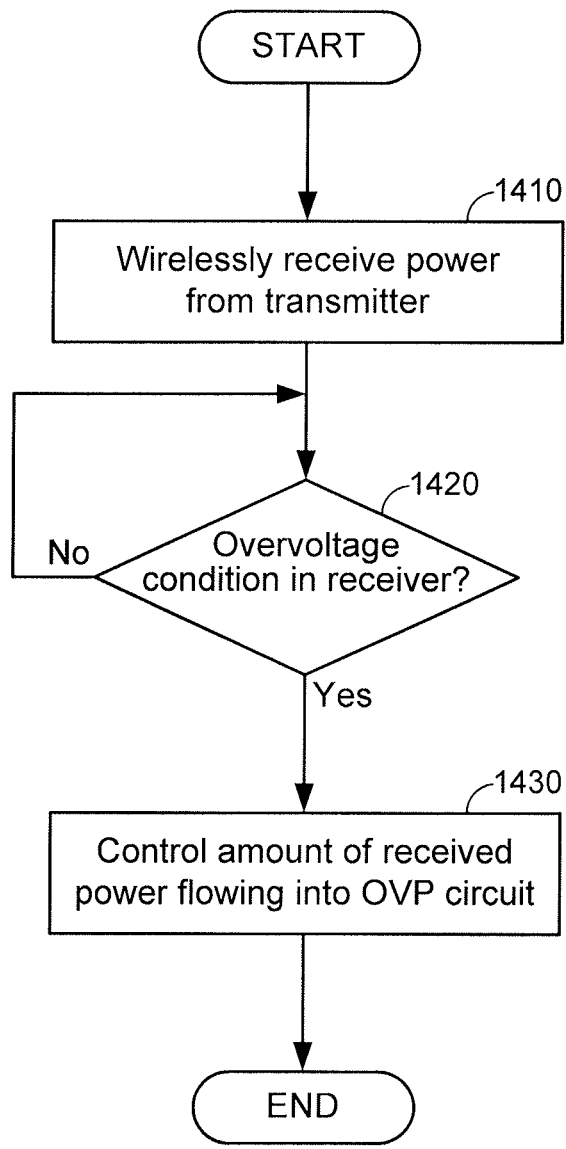
FIG. 14 is a flow chart showing an exemplary operation of a wireless power receiver for protecting an OVP circuit included therein in accordance with one exemplary implementation.

FIG. 14 is a flowchart showing an exemplary operation of a wireless power receiver (such as at least one of the receivers 600-1300) for protecting an OVP circuit included therein in accordance with one exemplary implementation. Depending on the implementation, additional states may be added, others removed, or the order of the states may change in FIG. 14. In state 1410, the receiver wirelessly receives, from a transmitter, power at a level sufficient to power or charge a load. In state 1420, the receiver determines whether an overvoltage condition has occurred in the wireless power receiver. If it is determined in state 1420 that the overvoltage condition has occurred in the wireless power receiver, the receiver controls an amount of the received power flowing into the overvoltage protection circuit (state 1430). The receiver may perform the controlling based on at least one of a matching circuit or a switching element that is electrically connected to each other and the load. Furthermore, the receiver may perform the controlling only when the overvoltage condition has occurred in the receiver and remains for a predetermined period of time. The receiver may reduce at least one of voltage, current or heat flowing into or to be generated at the overvoltage protection circuit.

Figure 15:
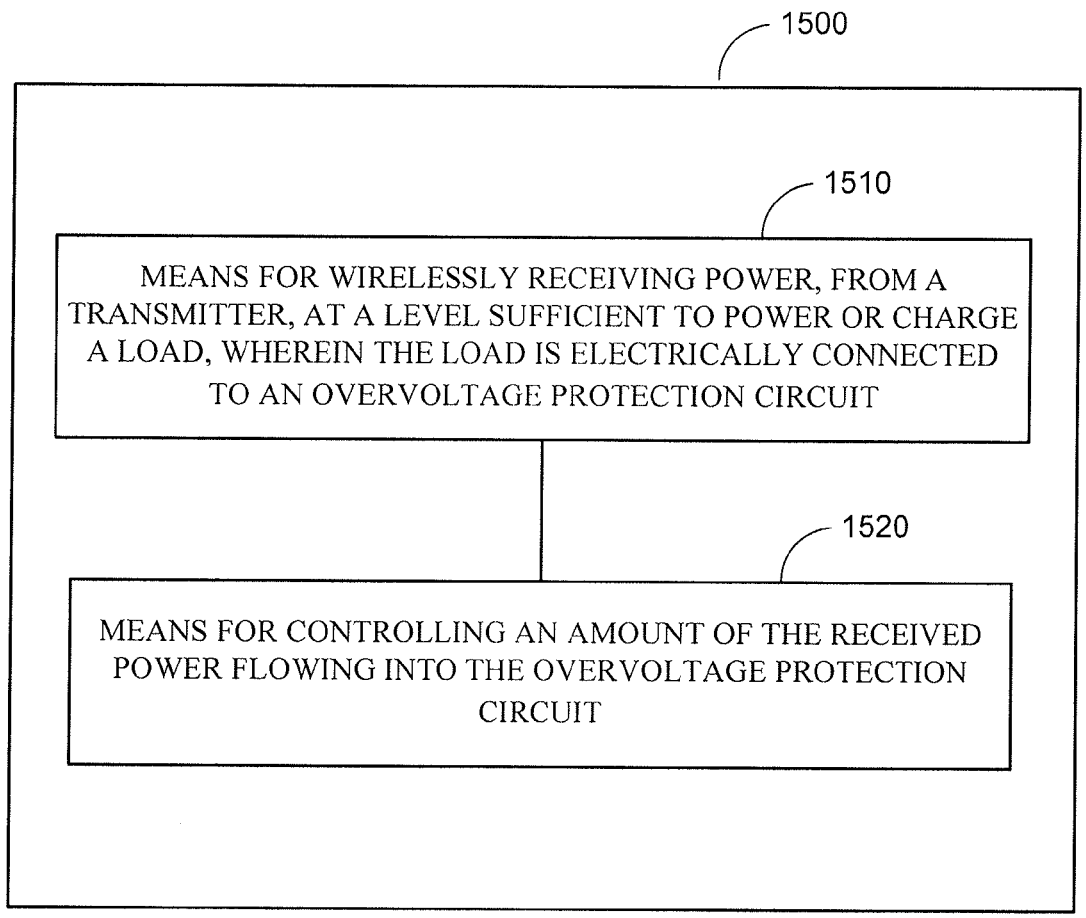
FIG. 15 is a block diagram of a wireless power receiver for protecting an overvoltage protection (OVP) circuit in accordance with another exemplary implementation.

FIG. 15 is a block diagram of a wireless power receiver for protecting an overvoltage protection (OVP) circuit in accordance with another exemplary implementation. Depending on the implementation, certain means may be removed from or additional means may be added to the receiver 1500. Furthermore, two or more means may be combined into a single means, or a single means may be realized as multiple means. The receiver 1500 may include means for wirelessly receiving 1510 and means for controlling 1520. The receiving means 1510 may wirelessly receive power, from a transmitter, at a level sufficient to power or charge a load. The load may be electrically connected to an overvoltage protection circuit. The receiving means 1510 may include an antenna circuit. The controlling means 1520 may control an amount of the received power flowing into the overvoltage protection circuit. The controlling means 1520 may include at least one of a matching circuit electrically connected to the receiving means 1510 or a switching element electrically connected to the matching circuit.

At least one of the disclosed implementations reduces the voltage, power and size requirements for an OVP circuit switch. Furthermore, at least one implementation allows for a lower gate drive voltage for the OVP circuit switch and permits for higher power output. Furthermore, at least one implementation enables the wireless power receiver to survive an overvoltage condition for a substantially indefinite period of time.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the invention.

The various illustrative blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in random access memory (RAM), flash memory, read only memory (ROM), electrically programmable ROM (EPROM), electrically erasable programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A wireless power receiver apparatus, comprising:
   an antenna circuit configured to wirelessly receive power, from a transmitter, at a level sufficient to power or charge a load, wherein the antenna circuit is electrically connected to an overvoltage protection circuit that is electrically connected between the antenna circuit and the load comprising a rectifier;
   a matching circuit electrically connected to the antenna circuit; and
   a switching element electrically connected to the matching circuit,
   wherein at least one of the matching circuit or the switching element is configured to reduce an amount of the received power flowing into the overvoltage protection circuit in response to an overvoltage condition,
   wherein the matching circuit comprises at least two components, wherein the switching element is electrically connected between the at least two components, and wherein the matching circuit is configured to reduce the amount of the received power and provide the reduced amount of the received power to the switching element.

2. A wireless power receiver apparatus, comprising:
   an antenna circuit configured to wirelessly receive power, from a transmitter, at a level sufficient to power or charge a load, wherein the antenna circuit is electrically connected to an overvoltage protection circuit that is electrically connected between the antenna circuit and the load comprising a rectifier;
   a matching circuit electrically connected to the antenna circuit; and
   a switching element electrically connected to the matching circuit,
   wherein at least one of the matching circuit or the switching element is configured to reduce an amount of the received power flowing into the overvoltage protection circuit in response to an overvoltage condition,
   wherein the matching circuit comprises at least two components, wherein the switching element is electrically connected between two of the at least two components, and
   wherein the switching element is connected in parallel with the two components of the matching circuit.

3. The apparatus of claim 1, wherein the matching circuit comprises at least one capacitor.

4. The apparatus of claim 1, wherein the load comprises at least one of the following: a DC-to-DC converter or a battery.

5. The apparatus of claim 1, wherein the switching element comprises a field effect transistor.

6. The apparatus of claim 1, wherein the overvoltage protection circuit comprises at least one of the matching circuit or the switching element.

7. The apparatus of claim 1, wherein the power comprises at least one of the following: voltage, current or heat.

8. The apparatus of claim 1, wherein at least one of the matching circuit or the switching element is configured to control power dissipation to be generated at the overvoltage protection circuit.

9. The apparatus of claim 1, wherein at least one of the matching circuit or the switching element is configured to reduce the power dissipation of the overvoltage protection circuit.

10. The apparatus of claim 1, wherein at least one of the matching circuit or the switching element is configured to protect the overvoltage protection circuit against the overvoltage condition.

11. The apparatus of claim 1, further comprising an overvoltage protection controller configured to detect the overvoltage condition.

12. The apparatus of claim 11, wherein the overvoltage protection controller is further configured to determine that the overvoltage condition has occurred when a voltage detected in the antenna circuit is greater than a threshold voltage.

13. The apparatus of claim 11, wherein the overvoltage protection controller is further configured to determine that the overvoltage condition has occurred when the detected voltage remains to be greater than a threshold voltage for a predetermined period of time.

14. A method of operating a wireless power receiver apparatus, comprising:
   wirelessly receiving, via an antenna circuit, power at a level sufficient to power or charge a load comprising a rectifier, wherein the load is electrically connected to an overvoltage protection circuit;

providing a matching circuit including at least two components and electrically connected to the antenna circuit and a switching element;

electrically connecting the switching element between the at least two components of the matching circuit; and reducing, via the matching circuit, an amount of the received power flowing into the overvoltage protection circuit in response to an overvoltage condition and providing the reduced amount of the received power to the switching element.

15. The method of claim 14, wherein the overvoltage protection circuit comprises at least one of the matching circuit or the switching element.

16. The method of claim 14, wherein the reducing is performed only when the overvoltage condition has occurred and remains for a predetermined period of time in the receiver apparatus.

17. The method of claim 14, wherein the reducing comprises reducing at least one of voltage, current or heat flowing into or to be generated at the overvoltage protection circuit.

18. One or more processor-readable storage devices having processor-readable code embodied on the processor-readable storage devices, the processor-readable code for programming one or more processors to perform a method of operating a wireless power receiver apparatus, the method comprising:

wirelessly receiving, via an antenna circuit, power at a level sufficient to power or charge a load comprising a rectifier, wherein the load is electrically connected to an overvoltage protection circuit;

providing a matching circuit including at least two components and electrically connected to the antenna circuit and a switching element;

electrically connecting the switching element between the at least two components of the matching circuit; and reducing, via the matching circuit, an amount of the received power flowing into the overvoltage protection circuit in response to an overvoltage condition and providing the reduced amount of the received power to the switching element.

19. The storage devices of claim 18, wherein the switching element is connected in parallel with the two components of the matching circuit.

20. A wireless power receiver apparatus, comprising:

means for wirelessly receiving power, from a transmitter, at a level sufficient to power or charge a load comprising a rectifier, wherein the load is electrically connected to an overvoltage protection circuit; and means for reducing an amount of the received power flowing into the overvoltage protection circuit in response to an overvoltage condition, wherein the reducing means comprises at least one of means for matching including at least two components and electrically connected to the receiving means or means for switching electrically connected between the at least two components of the matching means, and wherein the reducing means is configured to provide the reduced amount of the received power to the switching means.

21. The apparatus of claim 20, wherein the receiving means comprises an antenna circuit.

22. A processing apparatus, comprising:

a memory; and a processor coupled to the memory, the processor being configured to wirelessly receive, via an antenna circuit, power at a level sufficient to power or charge a load comprising a rectifier, wherein the load is electrically connected to an overvoltage protection circuit wherein the antenna circuit is electrically connected to a matching circuit and a switching element, wherein the matching circuit comprises at least two components, and wherein the switching element is electrically connected between the at least two components, and reduce, via the matching circuit, an amount of the received power flowing into the overvoltage protection circuit in response to an overvoltage condition and provide the reduced amount of the received power to the switching element.

23. The apparatus of claim 1, wherein at least one of the matching circuit or the switching element is configured to reduce the amount of the received power flowing into the overvoltage protection circuit in response to the overvoltage condition detected in the antenna circuit.

24. The apparatus of claim 1, wherein the overvoltage protection circuit comprises the switching element.

* * * * *